US012705981B2

(12) United States Patent
Nakamura

(10) Patent No.: US 12,705,981 B2
(45) Date of Patent: Aug. 11, 2026

(54) INFORMATION PROCESSING DEVICE AND INFORMATION PROCESSING METHOD

(71) Applicants: Nissan Motor Co., Ltd., Yokohama (JP); RENAULT S.A.S., Boulogne-Billancourt (FR)

(72) Inventor: Mitsunori Nakamura, Kanagawa (JP)

(73) Assignees: Nissan Motor Co., Ltd., Yokohama (JP); RENAULT S.A.S., Boulogne-Billancourt (FR)

(*) Notice: Subject to any disclaimer, the term of this patent is extended or adjusted under 35 U.S.C. 154(b) by 218 days.

(21) Appl. No.: 18/547,882

(22) PCT Filed: Mar. 10, 2021

(86) PCT No.: PCT/IB2021/000177

§ 371 (c)(1),
(2) Date: Aug. 25, 2023

(87) PCT Pub. No.: WO2022/189823

PCT Pub. Date: Sep. 15, 2022

(65) Prior Publication Data

US 2024/0135820 A1 Apr. 25, 2024
US 2024/0233543 A9 Jul. 11, 2024

(51) Int. Cl.

*G08G 1/16* (2006.01)
*H04B 7/08* (2006.01)
*H04W 4/40* (2018.01)

(52) U.S. Cl.

CPC ............ *G08G 1/163* (2013.01); *G08G 1/166* (2013.01); *H04B 7/0897* (2013.01); *H04W 4/40* (2018.02)

(58) Field of Classification Search

CPC ......... G08G 1/163; G08G 1/166; H04W 4/40; H04B 7/0897

See application file for complete search history.

(56) References Cited

U.S. PATENT DOCUMENTS 10,098,014 B1 * 10/2018 Shimizu .................. H04W 4/80
2017/0244160 A1 * 8/2017 Neubecker ........... H01Q 1/3208
(Continued)

FOREIGN PATENT DOCUMENTS

JP 6-344840 A 12/1994
JP 2001-309420 A 11/2001
(Continued)

OTHER PUBLICATIONS

Extended European Search Report of Mar. 13, 2024 of corresponding European Patent Application No. 21929436.0.
(Continued)

*Primary Examiner* — Naeem Taslim Alam
(74) *Attorney, Agent, or Firm* — Spencer Fane LLP

(57) ABSTRACT

An information processing device includes a communication unit and a controller. The communication unit performs data communication with another vehicle present in a periphery of a host vehicle. The controller controls the data communication performed by the communication unit. The controller identifies a designated moving body, which is the other vehicle for which a quality of communication with the host vehicle does not satisfy a predetermined standard. The controller controls directivity related to wireless communication performed by the communication unit based on a relative positional relationship between a first future position where the host vehicle will travel in the future and a second future position where the designated moving body will travel in the future.

15 Claims, 6 Drawing Sheets

(56) References Cited

U.S. PATENT DOCUMENTS

| | | | | |
|---|---|---|---|---|
| 2018/0188746 | A1* | 7/2018 | Lesher | G05D 1/0217 |
| 2019/0164423 | A1* | 5/2019 | Bai | G08G 1/096791 |
| 2020/0037301 | A1* | 1/2020 | Park | H04W 4/44 |
| 2021/0235285 | A1* | 7/2021 | Guerena | H04W 16/28 |
| 2021/0377706 | A1* | 12/2021 | Lekutai | H04W 4/06 |
| 2023/0367005 | A1* | 11/2023 | Hwang | G01S 13/88 |

FOREIGN PATENT DOCUMENTS

| | | | |
|---|---|---|---|
| JP | 2004-227412 | A | 8/2004 |
| JP | 2008-65481 | A | 3/2008 |
| JP | 2018-67880 | A | 4/2018 |
| JP | 2019134424 | A | 8/2019 |
| WO | 2020/022399 | A1 | 1/2020 |

OTHER PUBLICATIONS

Notice of Preliminary Rejection received for Korean Application No. 10-2023-7031764, mailed on Aug. 27, 2025, 6 pages.

* cited by examiner

INFORMATION PROCESSING DEVICE AND INFORMATION PROCESSING METHOD

CROSS-REFERENCE TO RELATED APPLICATIONS

This application is a U.S. national stage application of International Application No. PCT/IB2021/000177, filed on Mar. 10, 2021.

BACKGROUND

Technical Field

The present invention relates to an information processing device and an information processing method.

Background Information

Japanese Laid-Open Patent Application No. 2018-67880 (Patent Document 1) discloses a communication device comprising a communication unit that performs vehicle-to-vehicle communication with a plurality of other vehicles present around a host vehicle. The communication device furthermore comprises an acquisition unit for acquiring information relating to the plurality of other vehicles, and a control unit for controlling at least one of gain and directivity direction of the antenna unit based on the information acquired by the acquisition unit.

SUMMARY

A technique disclosed in Patent Document 1 involves controlling a directivity of an antenna unit with respect to other vehicles detected by a radar device. Even in a case involving other vehicles that could affect future travel of a host vehicle, the directivity of the antenna unit is not controlled with respect to the other vehicles until the radar device actually detects the other vehicles. Therefore, there is a concern that it will be impossible to suitably accept necessary information.

The present invention was contrived in view of the foregoing problem, it being an object of the present invention to provide an information processing device and an information processing method with which it is possible to suitably accept necessary information.

An information processing device according to an aspect of the present invention a communication unit that is mounted on a first moving body and performs data communication with a second moving body present in a periphery of the first moving body, and a controller 110 that controls the data communication performed by the communication unit. The controller 110 identifies a designated moving body that is the second moving body for which a quality of communication with the first moving body does not satisfy a predetermined standard, identifies a first future position where the first moving body will travel in the future, identifies a second future position where the designated moving body will travel in the future, and controls directivity related to wireless communication performed by the communication unit based on a relative positional relationship between the first future position and the second future position.

According to an aspect of the present invention, it is possible to suitably accept necessary information.

BRIEF DESCRIPTION OF THE DRAWINGS

Referring now to the attached drawings which form a part of this original disclosure.

DETAILED DESCRIPTION OF EMBODIMENTS

Figure 1:
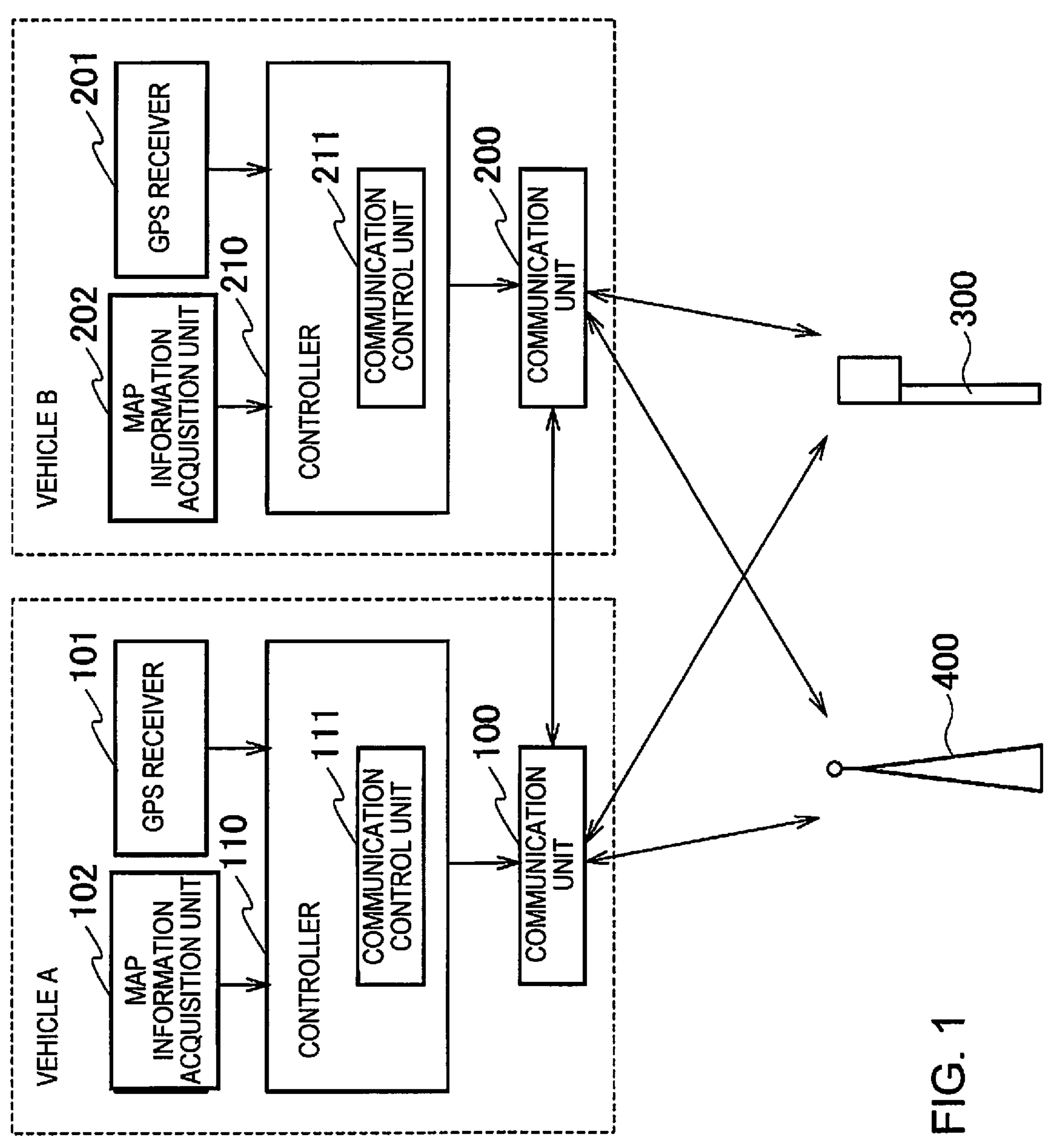
FIG. 1 is a block diagram showing a communication network according to the present embodiment.

A preferred embodiment of the present invention is described below with reference to the accompanying drawings. Identical configurations appearing in the drawings are assigned identical reference symbols and are not redundantly described.

A communication network according to the present embodiment shall be described with reference to FIG. 1. The communication network according to the present embodiment is provided with a vehicle A and a vehicle B. The vehicle A and the vehicle B are examples of moving bodies (first moving body and second moving body). The vehicle A is a host vehicle, and the vehicle B is another vehicle present around the host vehicle. In FIG. 1, only a single vehicle B is depicted, but there can be a plurality of vehicles B.

The vehicle A and the vehicle B can have autonomous driving functions, but also can lack autonomous driving functions. Additionally, the vehicle A and the vehicle B can be capable of switching between autonomous driving and manual driving. In the present embodiment, the vehicle A and the vehicle B are described as vehicles having autonomous driving functions.

The communication network is furthermore provided with a roadside unit 300, a base station 400.

The vehicle A is provided with a communication unit 100 having a data communication function. The vehicle B is provided with a communication unit 200 having a data communication function. Each of the communication units 100, 200 is configured from, e.g., one or more antennas, a modem, an application processor, a memory, and the like.

The communication unit 100 and the communication unit 200 are capable of communicating directly with one another. Direct communication performed by the communication unit 100 and the communication unit 200 is defined below as direct communication. Direct communication can also be expressed as vehicle-to-vehicle communication. In the present embodiment, the vehicle A and the vehicle B are capable of sharing a plurality of items of data, such as information pertaining to the vehicles (vehicle A and vehicle B), through direct communication.

The communication unit 100 and the communication unit 200 can also communicate with each other via the base station 400 and a network (not shown; e.g., a mobile phone network). The base station 400 is a fixed communication device that does not move, and is an access point that covers a network. Communication between the communication unit

100 and the communication unit 200 via the base station 400 and the network is defined as indirect communication as opposed to direct communication.

Direct communication, due to not being performed via the base station 400 and the network, makes it possible to transmit data to a counterpart using a simple configuration having low delay. Indirect communication is used when transmitting high-volume data that cannot be sent by direction communication or data that is to be repeatedly sent without there being any change in given-time information. Indirect communication can also be used in cases in which direct communication is impossible.

Each of the communication units 100, 200 can communicate with the roadside unit 300. The roadside unit 300 is a fixed communication device that can be installed, for example, on a road facility at a road shoulder, the roadside unit 300 distributing distribution data including prescribed information to vehicles on a road. The roadside unit 300 (RSU) can also be referred to as an intelligent transport systems (ITS) spot.

The roadside unit 300 indicated in the present embodiment corresponds to a transmitting station, and the communication units 100, 200 correspond to receiving stations. The roadside unit 300 and the communication units 100, 200 perform downlink communication from the roadside unit 300 to the communication units 100, 200. However, the roadside unit 300 and the communication units 100, 200 are capable of performing uplink communication in a reverse direction. In such a case, the communication units 100, 200 correspond to transmitting stations, and the roadside station 300 corresponds to a receiving station. Communication between the communication units 100, 200 and the roadside unit 300 is also referred to as road-to-vehicle communication.

The distribution data that is distributed from the roadside unit 300 includes roadside-unit data indicating information pertaining to the roadside unit 300, and traffic data indicating information pertaining to vehicles present around the roadside unit 300. The information pertaining to the roadside unit 300 includes, inter alia, position information pertaining to the roadside unit 300. The information pertaining to vehicles includes, inter alia, position information, speed information, and advancement-direction information pertaining to the vehicles.

Next, the configuration of the vehicle A will be described.

The vehicle A is provided with the communication unit 100 described above, a GPS receiver 101, a map information acquisition unit 102, and a controller 110. The communication unit 100, GPS receiver 101, map information acquisition unit 102, and controller 110 constitute an information processing device for realizing the vehicle-to-vehicle communication indicated in the present embodiment.

The GPS receiver 101 receives radio waves from an artificial satellite, thereby detecting position information pertaining to the vehicle A on a surface of Earth. The position information pertaining to the vehicle A detected by the GPS receiver 101 includes latitude information, longitude information, and time information. The GPS receiver 101 outputs the detected position information pertaining to the vehicle A to the controller 110. A method by which the position information pertaining to the vehicle A is detected is not limited to involving the GPS receiver 101. For example, the position can be estimated using a method known as odometry. Odometry is a method for deriving an amount of movement of the vehicle A and a movement direction thereof in accordance with a turning angle and a turning-angle speed of the vehicle A, whereby the position of the vehicle A is estimated. A global positioning system (GPS) is part of a global navigation satellite system (GNSS).

The map information acquisition unit 102 acquires map information indicating a structure of the road on which the vehicle A is traveling. The map information acquisition unit 102 can possess a map database in which the map information is stored or can acquire the map information from an external map data server through cloud computing. The map information acquisition unit 102 can also acquire the map information using vehicle-to-vehicle communication or road-to-vehicle communication.

The map information includes: node information, including a type of node, a position of the node, or other information indicating an intersection, junction, or the like; and link information, including a type, link length, lane count, curvature, slope, or other features of a link that is a road segment linking nodes. The link information also includes information pertaining to road structure, such as absolute positions of lanes and relationships pertaining to connection of the lanes. The map information furthermore includes information pertaining to traffic regulations, road signs, and the like.

The controller 110 is configured from, e.g., a microcomputer. The controller 110 has, e.g., a central processing unit (CPU) or other hardware processor, a memory, and a variety of interfaces. The memory and the variety of interfaces are connected to the hardware processor via a bus.

A computer program for causing the microcomputer to function as an information processing device is installed in the microcomputer. Due to execution of the computer program, the microcomputer functions as a plurality of information processing circuits provided to the information processing device. The controller 110 is provided with a communication control unit 111, as one example of the plurality of information processing circuits.

The communication control unit 111 controls wireless communication (data communication) performed by the communication unit 100.

The communication control unit 111 performs such actions as switching an operating mode of the communication unit 100 and controlling a beam formed by the communication unit 100. The communication unit 100 has, as operating modes that can be switched between, a normal mode and a directivity mode. The operating modes of the communication unit 100 shall be described with reference to FIGS. 2A and 2B.

Figure 2A:
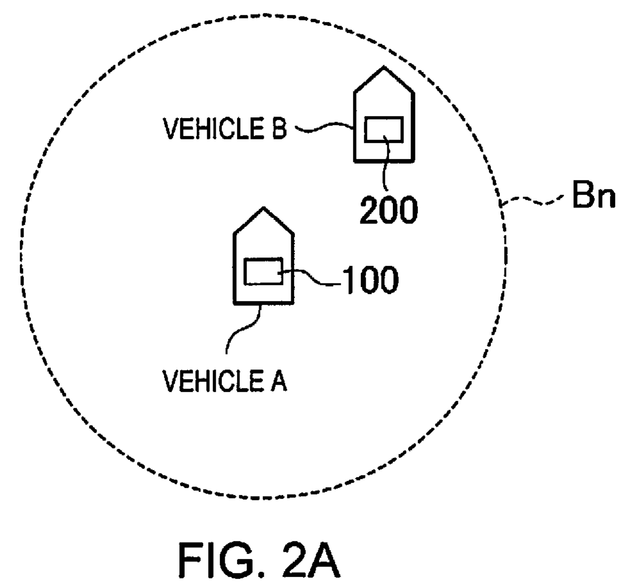
FIG. 2A is a diagram illustrating a normal mode of a communication unit.

The normal mode shall be described with reference to FIG. 2A. In the normal mode, wireless communication is performed for a preset range (area) without wireless-communication-related directivity of the communication unit 100 being controlled. When operating in the normal mode, the communication unit 100, or more specifically the antenna of the communication unit 100, forms a normal beam Bn for a prescribed range (area). The normal beam Bn is, for example, formed uniformly at every bearing, and does not have directivity with respect to a specific bearing. The normal beam Bn is formed in a circular range that is centered on the communication unit 100 and has a prescribed distance as a radius. Thus, the prescribed range in which the normal beam Bn is formed can be a circular range that has the prescribed distance as a radius or, as another example, can be a prescribed range having directivity in a prescribed direction, such as a vehicle advancement direction. Thus, in the normal mode, the normal beam Bn is formed for the preset prescribed range by the antenna of the communication unit 100.

The vehicle A can communicate with a vehicle B present within the area in which the normal beam Bn is formed. The area in which it is possible to communicate with a communication unit 100 operating in the normal mode is referred to as a normal communication area. The normal communication area basically corresponds to the area in which the normal beam Bn is formed. However, even in the area in which the normal beam Bn is formed, it might be impossible to communicate with the vehicle B at a communication quality equal to or higher than a given level due to effects of dampening of radio waves or effects of a communication environment in which an obstruction is present. Specifically, the normal communication area refers to an area in which it is possible to communicate with the vehicle B at a communication quality equal to or higher than a given level and does not necessarily coincide with the area (prescribed range) in which the normal beam Bn is formed.

Figure 2B:
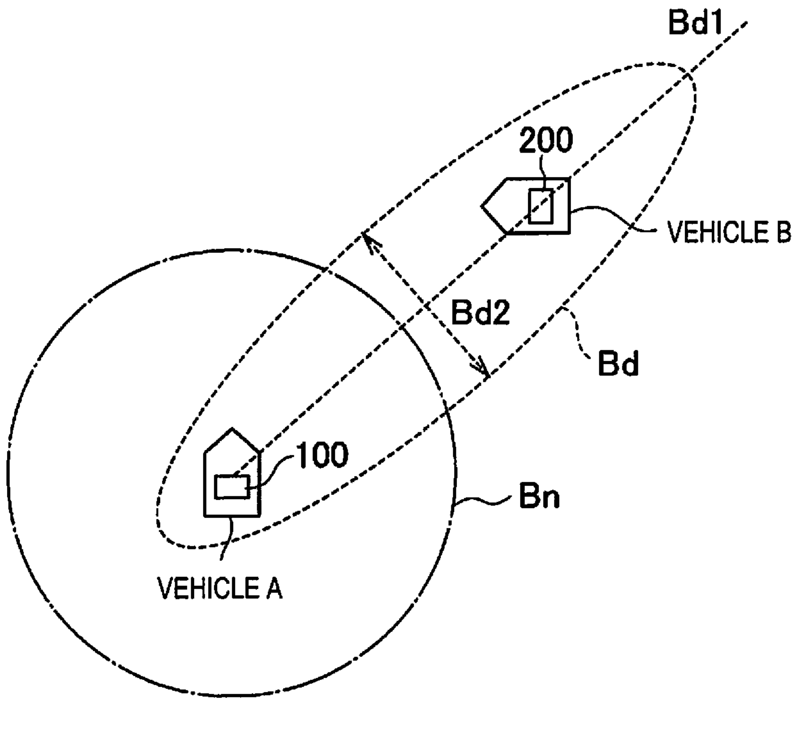
FIG. 2B is a diagram illustrating a directivity mode of the communication unit.

The directivity mode is described next with reference to FIG. 2B. The directivity mode allows control of directivity related to wireless signals of the communication unit 100. In the present description, the wireless-communication-related directivity is referred to below simply as "directivity." When operating in the directivity mode, the antenna of the communication unit 100 forms a directional beam Bd. The directional beam Bd is formed toward a specific bearing and has directivity with respect to the specific bearing. The bearing corresponds to a horizontal component of a direction. The directional beam Bd is formed as a beam having a prescribed beam width Bd2 centered on a beam axis Bd1 having a prescribed azimuth. The azimuth of the beam axis Bd1 and the beam width Bd2 can be individually adjusted, thereby making it possible to adjust the directivity of the communication unit 100. Thus, the directional mode corresponds to an operating mode in which the antenna of the communication unit 100 has directivity.

The vehicle A can communicate with the vehicle B present in the area in which the directional beam Bd is formed. The directional beam Bd is formed to be long in a direction following the beam axis Bd1, a distance in said direction (axial-direction distance) being greater than a radial distance of the normal beam Bn. Additionally, a reception strength in communication using the directional beam Bd is relatively higher than a reception strength in communication using the normal beam Bn when it is assumed that the vehicle B is present at a same position for each type of beam. Thus, using the directional beam Bd makes it possible to communicate with the vehicle B at a location outside of the normal communication area. The directional beam Bd makes it possible to perform data communication with the vehicle B present at a position at which it is impossible to perform data communication using the normal beam Bn. Specifically, in the directivity mode, directivity is controlled to a greater extent than in the normal mode, thereby making it possible to perform data communication with the vehicle B present at the position at which it is impossible to perform data communication in the normal mode.

When the communication unit 100 operates in the directivity mode, the communication control unit 111 controls the directional beam Bd. The control over the directional beam Bd includes beamforming for adjusting the azimuth of the beam axis Bd1 and the beam width Bd2. The communication control unit 111 controls the directivity of the communication unit 100, i.e., the directivity of the beam formed by the antenna of the communication unit 100, through beamforming.

The communication unit 100 broadcasts vehicle-A-position data including, inter alia, current position information and travel-plan information pertaining to the vehicle A. A direct communication scheme is used in the broadcast transmission. The direct communication scheme is, for example, DSRC (frequency: 5.9 GHz band), which is compliant with IEEE 802.11p, or Cellular V2X, which is compliant with specifications in 3GPP Release 14 or later.

The current position information is data correlating a latitude and longitude indicating a current position of the vehicle A and a time at which the position is acquired.

The travel-plan information is travel-plan data including vehicle-speed-plan data correlating a vehicle speed with a future position at which the vehicle A will travel in the future, and future-travel-route data. The future-travel-route data (future-route data) includes information pertaining to a route on which the vehicle A will travel in the future. The future-travel-route data can be route information pertaining to a travel route for traveling to a preset destination or can be data in which an expected passage time is correlated with a future position (latitude and longitude) based on the vehicle-speed-plan data. For example, the travel-plan information is data obtained by adding the vehicle-speed-plan data to data that conforms to a message under SAE J2735 (dedicated short range communications (DSRC) message set dictionary). The term "future" indicates a given point in time that will be reached after a prescribed time from a current time.

An example of the vehicle-A-position data that is broadcasted is shown in table 1. The vehicle-A-position data is package data including a header and content data.

TABLE 1

| | |
|---|---|
| Header | Identification number for transmission-source vehicle<br>Identification information indicating type of content included in content area (containing, e.g., current position, travel-plan information, and identification ID of future position) |
| Content data | Current position information: data correlating time when position information is acquired with latitude and longitude<br>Travel-plan information: travel-plan data including vehicle-speed-plan data correlating vehicle speed with future position of vehicle, and future-travel-route data |

As shown in table 1, an identification number for the vehicle A serving as a transmission source and identification information indicating a type of content included in the content data (e.g., an ID for identification indicating the current position information, the travel-plan information, and the like) are stored in the header of the vehicle-A-position data. The content data contains the current position information, which is data correlating the time when the position information is acquired with the latitude and longitude, and the travel-plan information.

As well as a function for controlling wireless communication performed by the communication unit 100, the communication control unit 111 assumes a data processing function for performing a variety of processes that are necessary for implementing wireless communication. The vehicle-A-position data, which is the package data including the header and the content data, is generated by the communication control unit 111 based on data acquired from the GPS receiver 101 or the like and data that is prerecorded in a memory provided to the controller 110. The vehicle-A-position data is transmitted by the communication unit 100 and received by the communication unit 200 of the vehicle B.

The communication unit 100 receives vehicle-B-position data that is transmitted by the communication unit 200 of the vehicle B and outputs the received vehicle-B-position data to the communication control unit 111. The communication control unit 111 acquires the vehicle-B-position data from the communication unit 100. Receipt of the vehicle-B-position data by the communication unit 100 means that direct communication between the vehicle A and the vehicle B is established.

In relation to the present embodiment, the communication control unit 111 uses the data processing function to identify the future positions where the vehicle A and the vehicle B will travel in the future. The communication control unit 111 controls the directivity of the communication unit 100 based on the relative positional relationship between a future position of the vehicle A and a future position of the vehicle B.

A configuration of the vehicle B shall be described next.

As shown in FIG. 1, the vehicle B is provided with the communication unit 200 described above, a GPS receiver 201, a map information acquisition unit 202, and a controller 210. The communication unit 200, the GPS receiver 201, the map information acquisition unit 202, and the controller 210 constitute an information processing device for realizing the vehicle-to-vehicle communication indicated in the present embodiment.

Functions of the GPS receiver 201 and the map information acquisition unit 202 are similar to functions of the GPS receiver 101 and the map information acquisition unit 102. The controller 210 is configured from a microcomputer provided with a hardware processor, a memory, and a variety of interfaces, similarly to the controller 110. The controller 210 is provided with a communication control unit 211 as one example of a plurality of information processing circuits. Functions of the communication control unit 211 are the same as functions of the communication control unit 111 and include a function for controlling wireless communication performed by the communication unit 200 and a data processing function for performing a variety of processes that are necessary for implementing wireless communication, such as generating the vehicle-B-position data.

Figure 3:
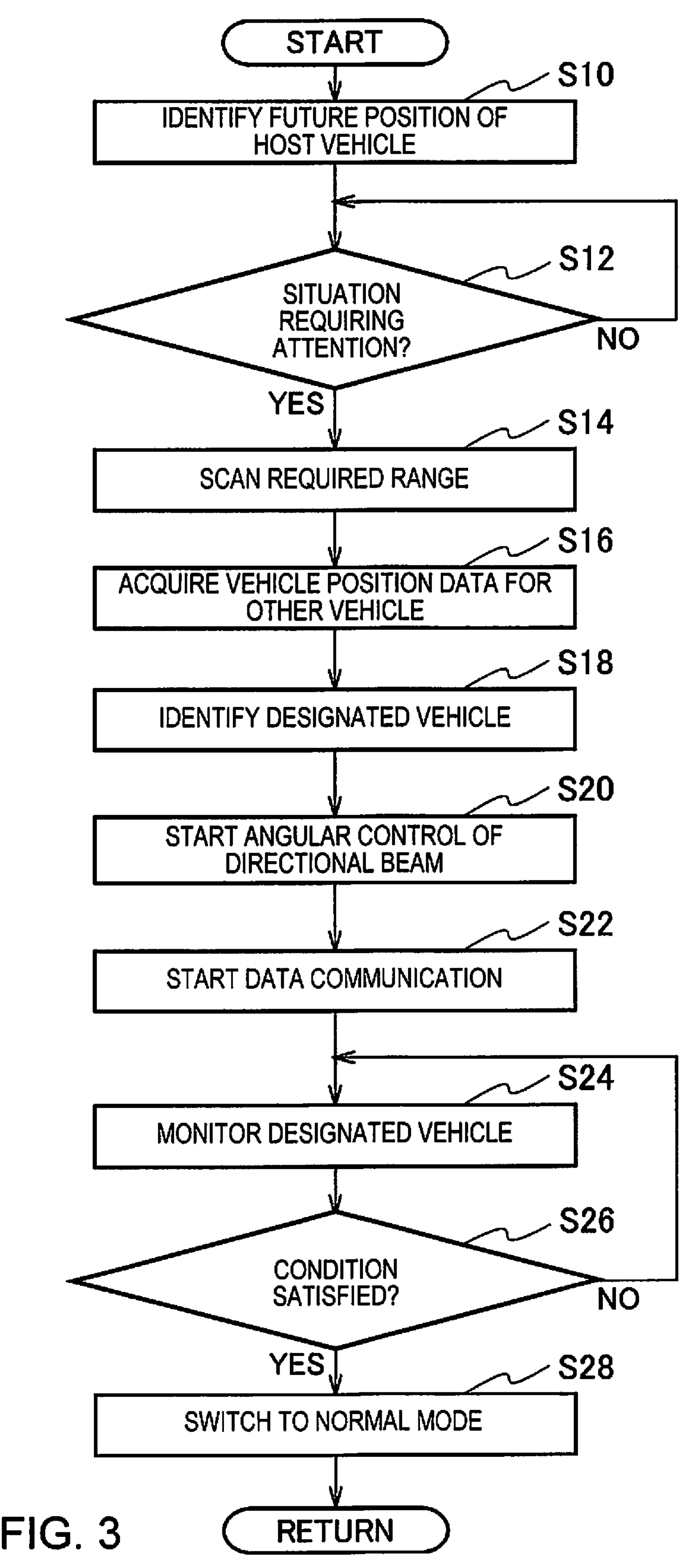
FIG. 3 is a flow chart showing a flow of a process in vehicle-to-vehicle communication on the communication network.

A flow of a process for vehicle-to-vehicle communication on the communication network shall be described with reference to FIGS. 3 to 6. The process shown in the flow chart in FIG. 3 is executed by the controller 110 of a host vehicle A (corresponding to the vehicle A in FIG. 1). The operating mode of the communication unit 100 is initially set to the normal mode. In the description given below, there is assumed to be a scenario involving traveling through an intersection such as that shown in FIG. 4. The host vehicle A is traveling on a road connecting to an intersection indicated by a node N1. A current position of the host vehicle A is a position (Xa, Ya) leading up to the intersection by a first distance. A route on which the host vehicle A will travel in the future is set as a route turning left at the intersection. Additionally, three other vehicles B1, B2, B3 (each of which corresponds to the other vehicle B in FIG. 1) are traveling on an intersecting road passing through the intersection indicated by the node N1. A current position of the other vehicle B1 is a position (Xb1, Yb1) beyond the intersection. A current position of the other vehicle B2 is a position (Xb2, Yb2) leading up to the intersection by a second distance, and a current position of the other vehicle B3 is a position (Xb3, Yb3) leading up to the intersection by a third distance. The second distance is shorter than a third distance, and the third distance is substantially the same as the first distance. Routes on which each of the other vehicles B1, B2, B3 will travel in the future are set as routes that advance straight ahead on the intersecting road.

First, the controller 110 identifies a future position where the host vehicle A will travel in the future (S10). The controller 110 acquires, e.g., vehicle speed plan data included in the vehicle-A-position data, and identifies the future position from this vehicle speed plan data. Alternatively, the controller 110 may acquire future travel route data included in the vehicle-A-position data and identify the future position based on the future travel route.

Figure 4:
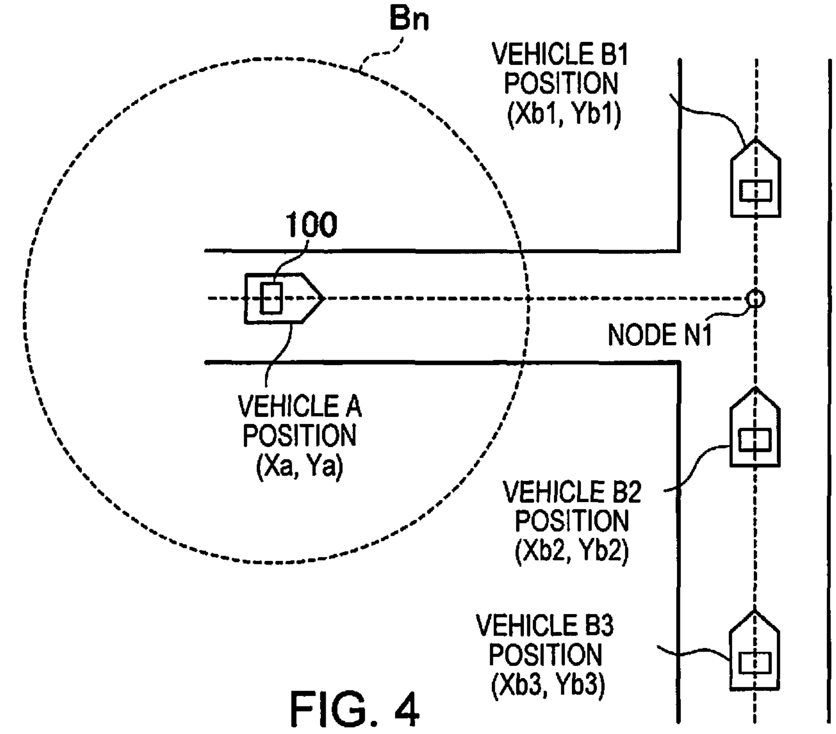
FIG. 4 is a diagram illustrating a travel scenario according to the present embodiment.

The controller 110 evaluates whether or not the traveling scenario of the host vehicle A is in a situation requiring attention. One example of a situation requiring attention is the scenario of traveling through an intersection, as shown in FIG. 4. The controller 110 refers to map information acquired by the map information acquisition unit 102. When the future position of the host vehicle A corresponds to an intersection, or when the intersection is included in the future travel route of the host vehicle A, the controller 110 evaluates that the traveling scenario of the host vehicle A is in a situation requiring attention. (Yes in S12).

The controller 110 switches the operation mode of the communication unit 100 from normal mode to directivity mode. The controller 110 then sweeps the directional beam Bd in the azimuth direction to scan a required range (S14). The range scanned by the directional beam Bd is centered on the current position and future position of the host vehicle A. The directional beam Bd thereby scans in front of the host vehicle on the road connected to the intersection, the intersection, and the intersecting road passing through the intersection. In the range scanned by the directional beam Bd, there are other vehicles B1, B2, and B3 having routes that pass through intersections included in the future route of the host vehicle A. The controller 110 acquires other vehicle-B-position data from each of the other vehicles B1, B2, and B3 (S16).

The controller 110 identifies a designated vehicle (S18). Specifically, when the communication unit 100 receives a signal (other vehicle B position data), the controller 110 detects the reception strength of the signal. The reception strength is a parameter for evaluating communication quality with other vehicles B1, B2, and B3. For example, the reception strength (dBm) is represented by a negative value of 0 or less, and the worse the communication quality is, the smaller the value (increases on the negative side) is. The controller 110 identifies, as designated vehicles, other vehicles whose reception strength is lower than a predetermined standard value. In other words, the controller 110 identifies the other vehicle for which a quality of communication does not satisfy the predetermined standard as the designated vehicle.

The radio wave attenuates in accordance with the distance, and the reception strength therefore changes in accordance with the distance between the host vehicle A and the other vehicles B1, B2, B3. Accordingly, the controller estimates the amount of attenuation of the reception strength based on the distances between the host vehicle A and the other vehicles B1, B2, and B3, and the other vehicle in which the quality of communication does not satisfy a predetermined standard can be evaluated based on the estimated amount of attenuation. Also, evaluation of communication quality is not limited to reception strength, and may be performed by focusing on other factors.

In the description below, it is assumed that the communication quality of each of the three other vehicles B1, B2, and B3 does not satisfy a predetermined standard. The controller 110 performs the following process, and narrows down the designated vehicle among the other vehicles B1, B2, and B3 in which the quality of communication does not satisfy a predetermined standard.

First, the controller 110 identifies the future positions of the other vehicles B1, B2, and B3 from the vehicle speed plan data included in the other vehicle B position data. Alternatively, the controller 110 acquires future travel route data included in the other vehicle B position data, and identifies the future position based on the future travel route.

Based on the relative positional relationship between the future position of the host vehicle A and the future positions of the other vehicles B1, B2, and B3, the controller 110 evaluates whether or not the host vehicle A will cross paths with the other vehicles B1, B2, and B3 in the future. Specifically, when the controller 110 evaluates that the future position of the host vehicle A and the future positions of the other vehicles B1, B2, and B3 at the same time in the future match or are within a certain range, it is evaluated that the host vehicle A and other vehicles B1, B2, and B3 will cross paths in the future. In the example shown in FIG. 4, the distance from the host vehicle A to the intersection and the distance from the other vehicle B3 to the intersection substantially match. When the speeds of the host vehicle A and the other vehicle B3 are substantially the same, the host vehicle A and the other vehicle B3 will enter the intersection at the same time in the future. Therefore, the host vehicle A and the other vehicle B3 have the same future position at the same time in the future, or are within a certain range. Accordingly, the controller 110 evaluates that the host vehicle A and the other vehicle B3 will cross paths. The other vehicles B1 and B2 do not have the above relationship with the host vehicle A, it is therefore evaluated that they will not cross paths with the host vehicle A. The controller 110 then assesses that the other vehicle B3 is the highest priority vehicle among the three other vehicles B1, B2, and B3. The controller 110 thereby confirms the other vehicle B3 with the highest priority as the final designated vehicle.

The method for evaluating future crossing of paths may be a method other than comparing future positions. For example, the controller 110 may evaluate future crossing of paths by comparing travel route data representing routes to be traveled in the future.

Also, depending on the other vehicles B1, B2, and B3, the content of the data to be transmitted differs, and there are cases in which the travel plan information (future position and future travel route) cannot be acquired. In this case, the controller 110 may evaluate future crossing of paths based on the current position information of the other vehicles B1, B2, B3. For example, if the difference between the distance from the current position of the host vehicle A to the intersection and the distance from the current positions of the other vehicles B1, B2, and B3 to the intersection is equal to or less than a standard value, the controller 110 evaluates that the two vehicles will not cross paths.

The controller 110 can also identify the speeds of the other vehicles B1, B2, and B3 from changes in the current positions of the other vehicles B1, B2, and B3. The controller 110 can thereby obtain the relative velocities of the other vehicles B1, B2, and B3 with respect to the host vehicle A. When the host vehicle A and other vehicles B1, B2, and B3 approach each other toward an intersection, the relative speeds of other vehicles B1, B2, and B3 to the host vehicle A become negative. Accordingly, when the relative speeds of the other vehicles B1, B2, and B3 with respect to the host vehicle A are lower than a predetermined assessment value (for example, zero), the controller 110 may evaluate that the two will cross paths.

The controller 110 predicts the future travel routes of the other vehicles B1, B2, and B3 based on the current positions of the other vehicles B1, B2 and B3, the speeds of the other vehicles B1, B2 and B3, and the map information. The controller 110 may compare the future travel route of the host vehicle A with the future travel routes of the other vehicles B1, B2, and B3 to evaluate whether the two will cross paths.

The controller 110 may use these techniques alone or in combination to compositely evaluate future crossing of paths. The controller 110 can thereby specify, as the designated vehicle, the other vehicle B3, which has the highest priority among the other vehicles B1, B2, and B3 having a route passing through the intersection included in the future route of the host vehicle A.

Figure 5:
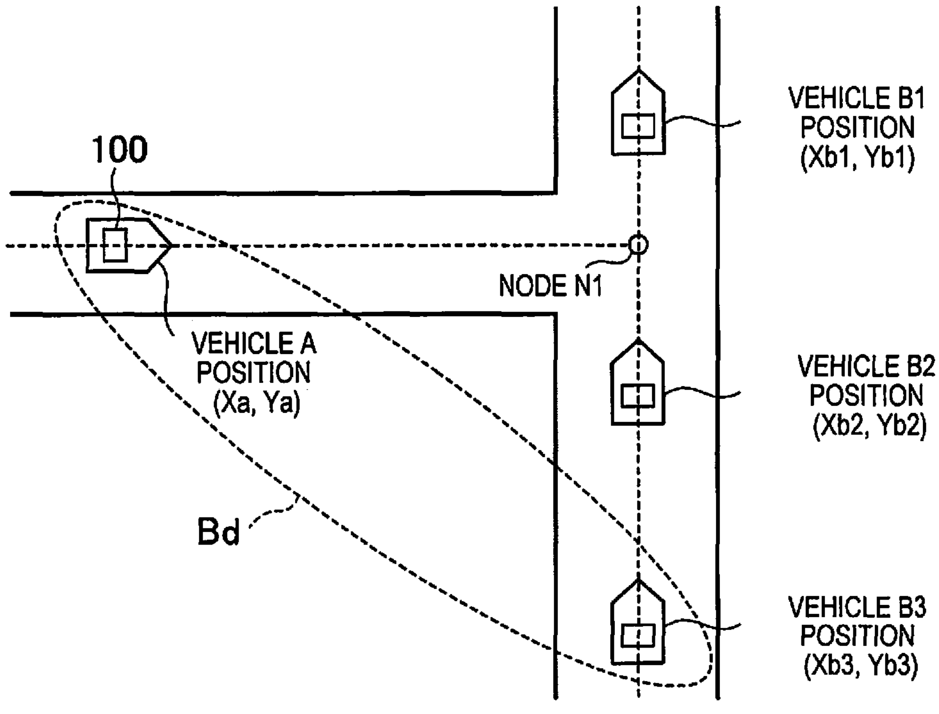
FIG. 5 is a diagram illustrating a designated vehicle and a directional beam.
Figure 6:
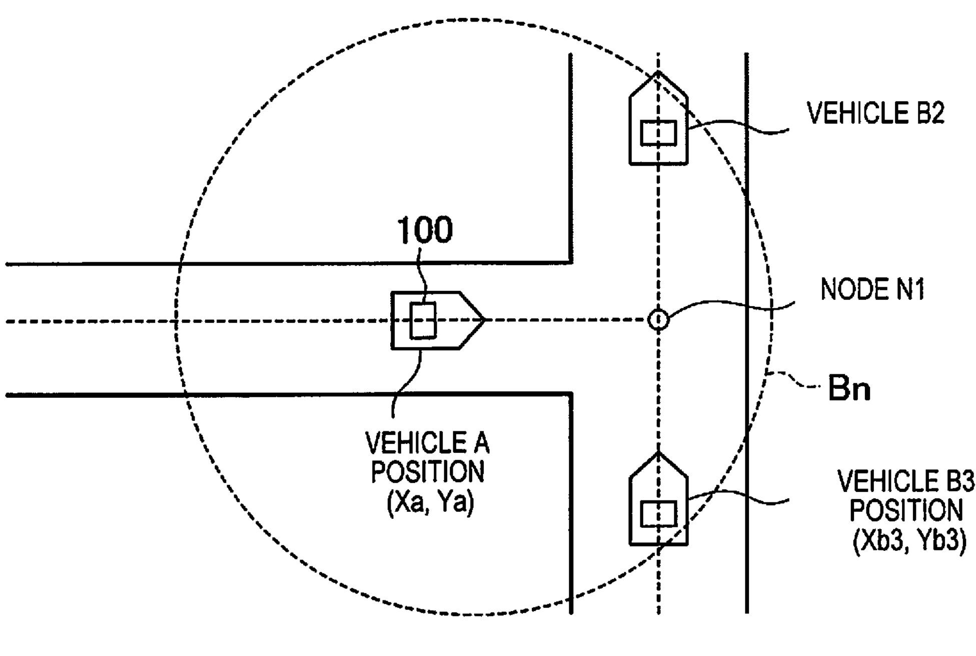
FIG. 6 is a schematic diagram showing switching to the normal mode.

When the designated vehicle is specified, the controller 110 starts angular control of the directional beam Bd (S20). As shown in FIG. 5, the controller 110 controls the directional beam Bd so that the directional beam Bd is directed toward the other vehicle B3, which is the designated vehicle. In other words, the controller 110 adjusts the beam axis Bd1 of the directional beam Bd to a predetermined azimuth. The azimuth to which the beam axis Bd1 should be directed can be identified by calculating the azimuth when the other vehicle B3 is observed from the host vehicle A based on the current position of the host vehicle A and the current position of the other vehicle B3. By controlling the azimuth of the beam axis Bd1, the directional beam Bd is adjusted to face the current position of the other vehicle B3.

When the directional beam Bd is directed at the other vehicle B3, the controller 110 then controls the directional beam Bd to follow the other vehicle B3 which moves. A possible method for following the other vehicle B3 is to continuously identify the current position of the other vehicle B3 using data communication with the other vehicle B3, and control the azimuth of the directional beam Bd based on the latest current position. The controller 110 may also control the azimuth of the directional beam Bd via feedback so as to search for the point where the reception strength is maximized.

The controller 110 starts the data communication with the other vehicle B3 (S22).

The controller 110 monitors the other vehicle B3 (S24). Monitoring the other vehicle B3 includes monitoring the reception strength and monitoring the current position of the other vehicle B3.

The controller 110 determines whether or not the other vehicle B3 meets conditions that allow communication even with the normal beam Bn. Specifically, when the reception strength has risen to a certain level, or when the current position of the other vehicle B3 is within the area of the normal beam Bn, the controller 110 determines that the above conditions are met (Yes in S26), and the operating mode of the communication unit 100 is switched to the normal mode (S28). When the controller 110 evaluates that the conditions are not met, the controller 110 continues monitoring the other vehicle B3 (B24).

Thus, in the present embodiment, the controller 110 of the information processing device controls the directivity of the communication unit 100 based on the relative positional relationship between the future position of the host vehicle and the future position of the other vehicle. By considering the relative positional relationship, another vehicle (second moving body) that will affect the future traveling of the host vehicle (first moving body) can be ascertained, and therefore, the directivity of the communication unit can be controlled to face a desired communication target from which the other vehicle information can be obtained. Data communication with the communication target can thereby be performed satisfactorily, and necessary information can be suitably received.

In the present embodiment, the controller 110 of the information processing device identifies the future position of the host vehicle and the other vehicles from the future route data of the host vehicle and the other vehicles. Since the route to be traveled in the future can be considered, the future position can be identified with high accuracy. As a result, it is possible to suitably ascertain other vehicles that may affect the future traveling of the host vehicle.

In the present embodiment, other vehicles having routes that pass through the intersection included in the future route of the host vehicle are given as examples of designated vehicles. The other vehicles are preferably regarded as designated vehicles due to having a high possibility of affecting the future travel of the host vehicle. This makes it possible to suitably ascertain other vehicles that could affect the future travel of the host vehicle.

In the present embodiment, the controller 110 of the information processing device evaluates whether or not the host vehicle and the designated vehicle will cross paths in the future, and controls the directivity of the communication unit 100 based on the evaluation result. When the host vehicle and the designated vehicle will cross paths in the future, the designated vehicle has great influence on the future traveling of the host vehicle. Evaluating the crossing of paths makes it possible to suitably ascertain other vehicles that may affect the future traveling of the host vehicle.

In the present embodiment, the controller 110 of the information processing device controls the directivity of the communication unit 100 toward the designated vehicle evaluated to cross paths. The host vehicle can reliably perform data communication with other vehicles that will cross paths in the future, and can therefore suitably receive necessary information.

The crossing of paths of the host vehicle and the designated vehicle can be evaluated from the relative speed of the designated vehicle with respect to the host vehicle. Accordingly, taking the relative speed of the designated vehicle with respect to the host vehicle into consideration makes it possible to suitably evaluate the crossing of paths.

When another vehicle traveling on an intersecting road enters the intersection into which the host vehicle is entering, the relative speed of the other vehicle with respect to the host vehicle is less than or close to zero. Accordingly, the controller can evaluate that the host vehicle and the designated vehicle will cross paths on condition that the relative speed is less than a predetermined assessment value.

In the present embodiment, the communication unit 100 forms a beam having directivity, which allows the directivity of the communication unit 100 to be adjusted. The directivity of the communication unit 100 can thereby be suitably controlled.

When the communication unit 100 operates in the normal mode which does not have directivity, it may not be possible for data communication to be satisfactorily performed with a communication target from which desired other-vehicle information can be obtained. However, switching the operating mode of the communication unit 100 to directivity mode makes it possible to control the directivity of the communication unit 100 with respect to the desired communication target. Data communication with the communication target can thereby be satisfactorily performed, and necessary information can be suitably received.

In the present embodiment, the controller 110 of the information processing device scans the periphery of the host vehicle and acquires the future travel route of the designated vehicle by performing data communication with the designated vehicle. The route that the designated vehicle will travel in the future can thereby be ascertained, and the future position of the designated vehicle can be accurately identified.

Figure 7:
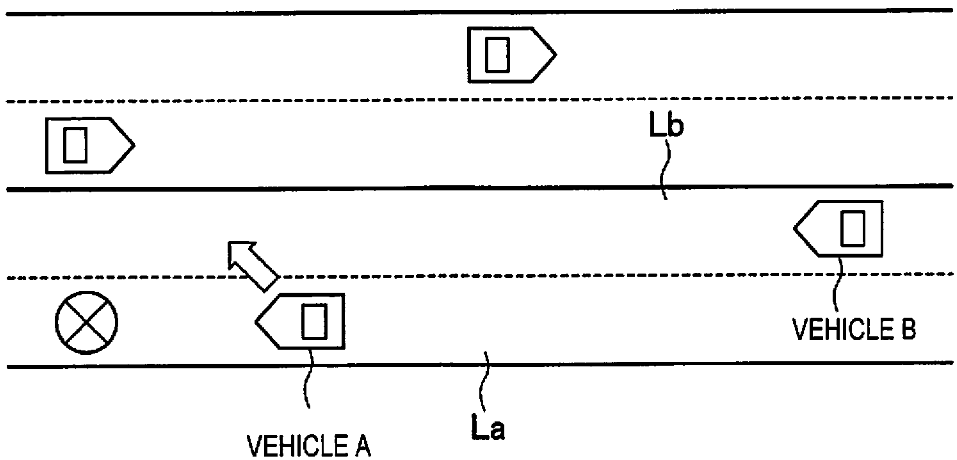
FIG. 7 is a diagram illustrating a travel scenario in which the present embodiment can be applied.

In the embodiment described above, the scenario of traveling through an intersection is given as a situation requiring attention. However, a situation requiring attention can be a scenario in which there is another vehicle that may affect the future traveling of the host vehicle, such as when the host vehicle and another vehicle cross paths. For example, the scenario may be one in which the host vehicle A traveling in a travel lane La changes lanes to an overtaking lane Lb, as shown in FIG. 7. The other vehicle B traveling in the overtaking lane Lb may cross paths with the host vehicle A, and therefore, there is a high possibility that future travel will be affected. Therefore, in the lane change scenario, the other vehicle B having a route that travels through the overtaking lane Lb of the road on which the host vehicle A is traveling is specified as the designated vehicle. The other vehicle B which will affect the future traveling of the host vehicle A can thereby be suitably ascertained. The scenario in which passing is performed may be a situation in which passing is performed using the oncoming lane instead of using the overtaking lane.

The controller 110 preferably performs the process for specifying the designated vehicle when it is assessed that the host vehicle is performing passing. For example, when a passenger-instigated pass-permitting operation signal is detected, the controller 110 assesses that the host vehicle is performing passing. Alternatively, the controller 110 can autonomously assess, based on map information and data pertaining to traveling vehicles, that the host vehicle is performing passing under a condition that an obstacle is present in front of the host vehicle in the travel lane or that a preceding vehicle slower than the host vehicle is present. Thus, when the host vehicle is performing passing, performing the process for specifying the designated vehicle using passing of the host vehicle as a trigger makes it possible to specify the designated vehicle at a suitable timing.

The situation requiring attention is not limited to a specific travel scenario. When another vehicle is present outside the normal communication area of the communication unit 100, the other vehicle may affect the future traveling of the host vehicle. For example, the controller 110 sweeps the directional beam Bd to scan the entire periphery of the host vehicle to thereby assess whether or not there is another vehicle positioned outside the normal communication area. It is thereby possible to suitably ascertain other vehicles that may affect the future traveling of the host vehicle.

In the present embodiment, when specifying the designated vehicle, the controller 110 controls the directional beam Bd so as to be oriented toward the designated vehicle. However, the goal of communication with the designated vehicle performed by the host vehicle is to acquire information pertaining to the designated vehicle that will cross the path of the host vehicle. Even if the directional beam Bd is formed, vehicle-to-vehicle communication with the designated vehicle might be impossible due to a communication environment in which an obstruction is present between the host vehicle and the designated vehicle.

Figure 8:
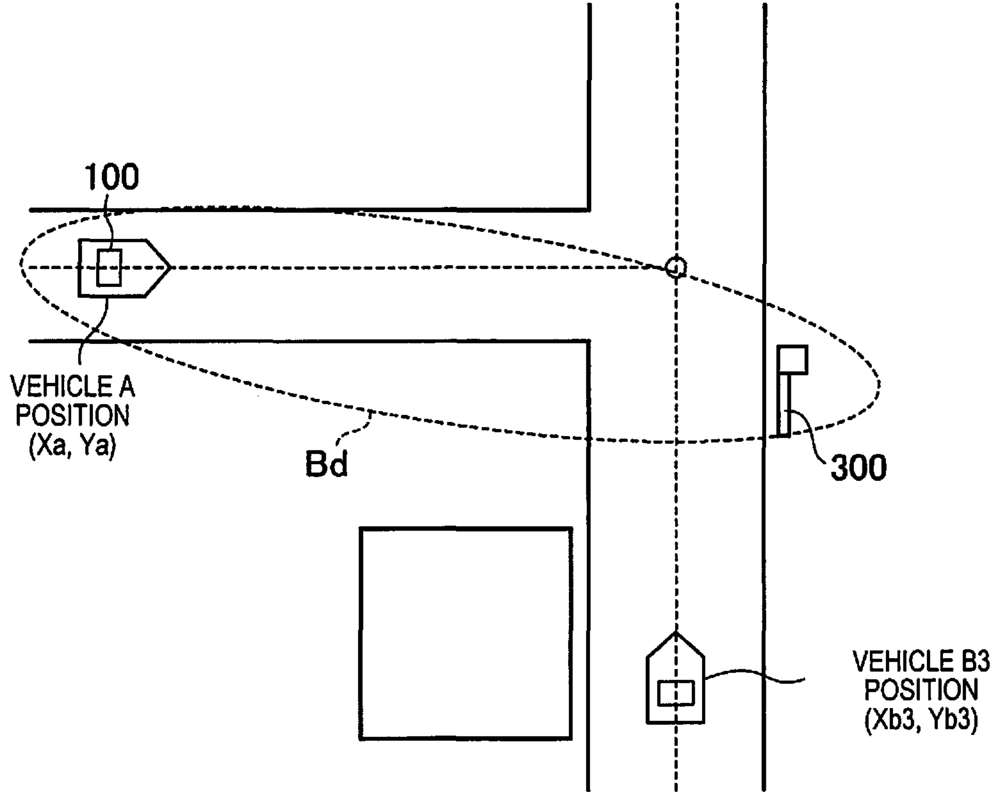
FIG. 8 is a schematic diagram showing a roadside unit and a directional beam.

As shown in FIG. 8, there may be a roadside unit 300 that distributes vehicle information on the road on which the host vehicle travels. As such, when there is a roadside unit 300 that transmits distribution data including information about the designated vehicle, the controller 110 may control the directional beam Bd to face the roadside unit 300. For example, when the controller 110 has successfully communicated with the roadside unit 300 during the above-noted scan operation, the controller 110 can analyze the distribution data to thereby evaluate whether or not the roadside unit 300 transmits distribution data including information about the designated vehicle. It is also possible to acquire, from the distribution data, the position information of the roadside unit 300 to which the directional beam Bd should be directed.

Thus, the controller 110 may control the directivity of the communication unit 100 to face the roadside unit 300 that transmits distribution data including information about the designated vehicle evaluated to cross paths. It is thereby possible to reliably perform data communication with the roadside unit 300, and information about the designated vehicle evaluated to cross paths can therefore be suitably received. In other words, the controller 110 may treat the roadside unit 300, which transmits distribution data including information about the designated vehicle, as the designated vehicle in lieu of the actual designed vehicle.

Also, according to the information processing method disclosed in the present embodiment, the directivity of the communication unit 100 can be controlled based on the relative positional relationship between the future position of the host vehicle and the future position of the other vehicle in similar fashion to the information processing device. Giving consideration to the relative positional relationship makes it is possible to ascertain the other vehicle (second moving body) that will affect the future traveling of the host vehicle (first moving body), and the directivity of the communication unit can therefore be controlled to face the desired communication target from which the other vehicle information can be obtained. It is thereby possible for data communication to be satisfactorily performed with the communication target, and necessary information can therefore be suitably received.

In the present embodiment, an example is given in which a plurality of information processing circuits provided to controllers 110, 210 are realized using software. However, as shall be apparent, it is also possible to configure the information processing circuits by preparing dedicated hardware for processing various information. It is also possible for the plurality of information processing circuits to be configured from individual items of hardware.

Although an embodiment of the present invention is disclosed as described above, statements and drawings that form parts of this disclosure is not to be construed to limit the present invention. A variety of alternative embodiments, examples, and techniques for implementation will be apparent to persons skilled in the art from this disclosure.

The invention claimed is:

1. An information processing device comprising:

a communication unit including an antenna, the communication unit being configured to be mounted on a first moving body and to perform data communication with a second moving body present in a periphery of the first moving body; and a controller configured to control the data communication performed by the communication unit, the communication unit having operating modes configured to be switched between a directivity mode in which directivity of wireless communication can be controlled and a normal mode in which the wireless communication in a preset area is performed without controlling the directivity of the wireless communication, the controller being configured to refer to map information to evaluate whether or not a travel situation exists in which the second moving body that will affect future travel of the first moving body is present, switch the operating mode of the communication unit from the normal mode to the directivity mode when said travel situation is determined to exist, and subsequently identify a designated moving body that is the second moving body for which a current quality of communication with the first moving body does not satisfy a predetermined standard by controlling the directivity of the wireless communication performed by the communication unit in a sweeping fashion to scan the periphery of the first moving body, identify a first future position where the first moving body will travel in the future, identify a second future position where the designated moving body will travel in the future, and control the directivity of the wireless communication performed by the communication unit based on a relative positional relationship between the first future position and the second future position.

2. The information processing device according to claim 1, wherein the controller is configured to acquire first future route data that includes a route to be traveled by the first moving body in the future, and identify the first future position based on the first future route data, and acquire second future route data that includes a route to be traveled by the second moving body in the future, and identify the second future position based on the second future route data.

3. The information processing device according to claim 2, wherein the designated moving body is the second moving body positioned outside an ordinary communication area of the communication unit, the second moving body having a route that travels through an overtaking lane of a road traveled by the first moving body, or the second moving body having a route that passes through an intersection included in the route that the first moving body will travel in the future.

4. The information processing device according to claim 1, wherein the controller is configured to determine whether or not the first moving body and the designated moving body will undergo a crossing of paths in the future based on the relative positional relationship, and control the directivity of the wireless communication performed by the communication unit based on a result of determining the crossing of paths.

5. The information processing device according to claim 4, wherein the controller is configured to control the directivity of the wireless communication performed by the communication unit to face the designated moving body determined to undergo the crossing of paths with the first moving body.

6. The information processing device according to claim 4, wherein the controller is configured to determine whether or not the first moving body and the designated moving body will undergo the crossing of paths in the future based on a relative speed of the designated moving body with respect to the first moving body.

7. The information processing device according to claim 6, wherein the controller is configured to determine that the first moving body and the designated moving body will undergo the crossing of paths when the relative speed of the designated moving body with respect to the first moving body is less than a predetermined assessment value.

8. The information processing device according to claim 1, wherein the controller is configured to determine whether or not the first moving body will perform an overtaking maneuver, and perform a process for identifying the designated moving body when the first moving body is determined to perform the overtaking maneuver.

9. The information processing device according to claim 1, wherein the communication unit is configured to adjust the directivity of the wireless communication performed by the communication unit by forming a beam having directivity, and the controller is configured to control the directivity of the beam formed by the communication unit and thereby control the directivity of the wireless communication performed by the communication unit.

10. The information processing device according to claim 3, wherein a normal communication area is an area in which the data communication can be performed with the communication unit operating in the normal mode.

11. The information processing device according to claim 4, wherein the communication unit is configured to perform the data communication with a roadside unit disposed in a periphery of the road on which the first moving body travels, and the controller is configured to control the directivity of the wireless communication performed by the communication unit to face the roadside unit that transmits distribution data including information related to the designated moving body determined to undergo the crossing of paths.

12. An information processing method for an information processing device comprising a communication unit configured to be mounted on a first moving body and performs data communication with a communication target which includes a second moving body, and a controller configured to control the data communication performed by the communication unit, the information processing method comprising:

referring to map information to determine whether or not a travel situation exists in which the second moving body that will affect the future travel of the first moving body is present;

switching the operating mode of the communication unit from the normal mode to the directivity mode when said travel situation is determined to exist, and subsequently identifying a designated moving body that is the second moving body for which a current quality of communication with the first moving body does not satisfy a predetermined standard by controlling directivity of wireless communication performed by the communication unit in a sweeping fashion to scan a periphery of the first moving body;

identifying a first future position where the first moving body will travel in the future;

identifying a second future position where the designated moving body will travel in the future; and controlling the directivity of the wireless communication performed by the communication unit the communication unit based on a relative positional relationship between the first future position and the second future position.

13. The information processing device according to claim 1, wherein the directivity of the wireless communication performed by the communication unit is oriented in a specific direction in the directivity mode, and the controller is configured to control the directivity of the wireless communication performed by the communication unit in an azimuth direction when the periphery of the first moving body is scanned in the sweeping fashion.

14. The information processing device according to claim 13, wherein the scan of the periphery of the first moving body in the sweeping fashion is performed around a current position of the first moving body and the first future position.

15. The information processing device according to claim 14, wherein the periphery of the scan includes an area in front of the first moving body and an intersection on a route to be traveled by the first moving body in the future, and an intersecting road that passes through the intersection.

* * * * *